United States Patent Office

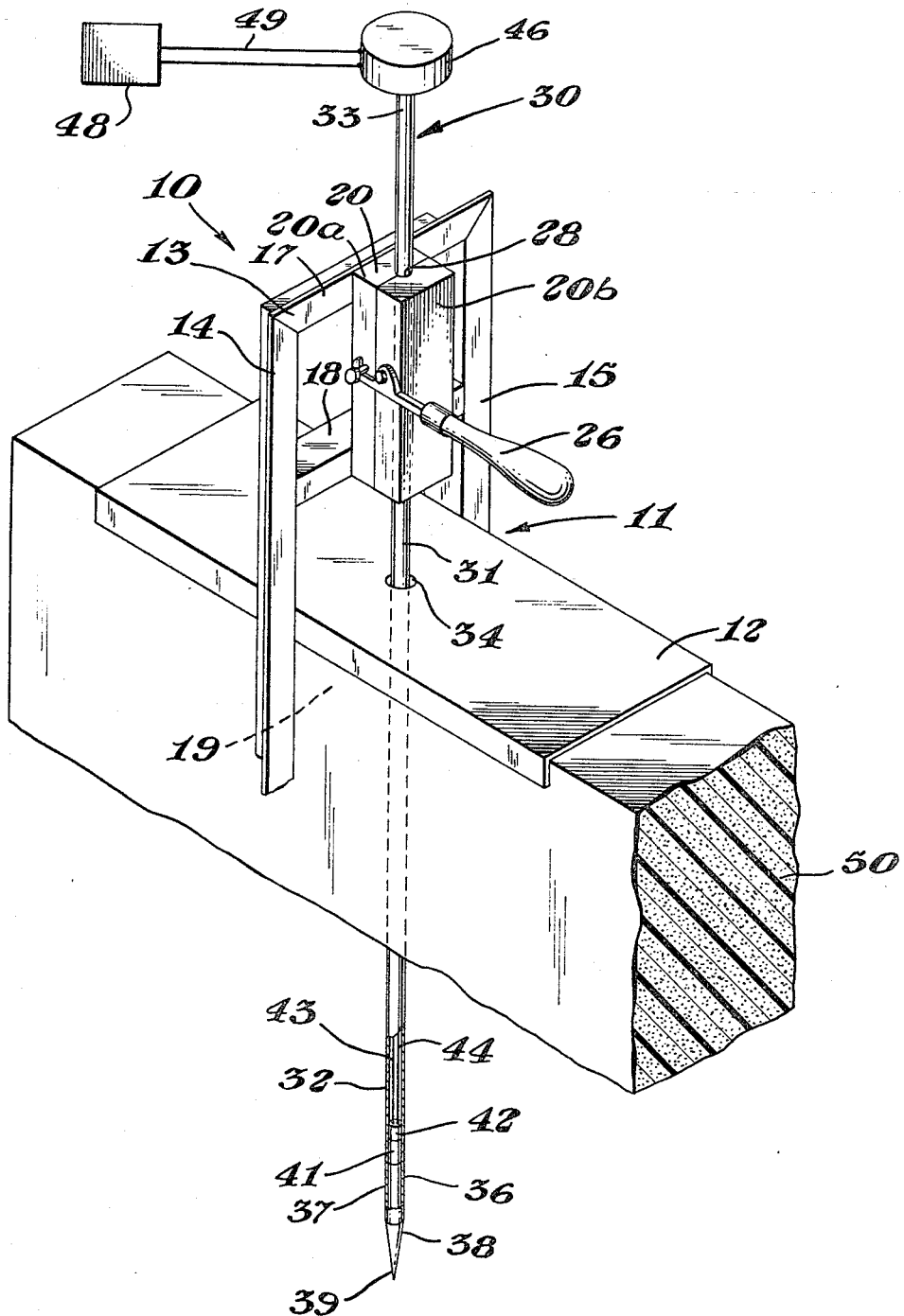

3,396,616
Patented Aug. 13, 1968

3,396,616
METHOD AND APPARATUS FOR PERFORATING THERMOPLASTIC FOAMS
Donald R. Wright, Midland, Mich., assignor to The Dow Chemical Company, Midland, Mich., a corporation of Delaware
Filed May 16, 1966, Ser. No. 550,467
8 Claims. (Cl. 83—16)

ABSTRACT OF THE DISCLOSURE

An electrically heated lance slidably held in a guide is employed to perforate foam plastics. Relatively long holes are readily formed.

---

This invention relates to a method and apparatus for perforating synthetic resinous foams, and more particularly relates to an apparatus for the formation of relatively long holes within a thermoplastic foam body.

Synthetic resinous foams are finding increasing use in the construction of buildings of various shapes and sizes. Oftentimes, such foams are available and used in the form of relatively large bodies such as panels and frequently, walled structures are prepared by joining together strips or portions of foam in the manner set forth in U.S. 3,206,899 to provide foam bodies of relatively large size. Frequently, it is desirable to pass reinforcing elements such as bolts or rods through foam plastic to provide a connection to another structural element, or in the cases of foam plastic domes, to secure the dome to a suitable foundation. Frequently, sandwich panels are employed which require elongated reinforcing or tying elements to be passed therethrough. Oftentimes, the distance to be traversed may be eight or ten feet or even greater. Generally, it is extremely difficult to bore a hole employing conventional portable tools to a depth of several feet into a foam body and have the opening emerge at a desired location. Frequently, such synthetic resinous foams have portions therein of varying density which cause a tool such as a drill or extension bit to lead in one or more directions and form a hole which is unsatisfactorily positioned.

It would be beneficial and advantageous if there were available a method and apparatus suitable for the formation of long holes in thermoplastic resinous foamed bodies.

It would also be advantageous if such an apparatus would form long holes in foam bodies with a minimum amount of labor.

It would also be advantageous if there were available a relatively simple apparatus and method for the formation of long holes in thermoplastic foam materials.

These benefits and other advantages in accordance with the present invention are readily achieved in the method for the formation of long holes in synthetic thermoplastic resinous bodies, the steps of the method comprising providing a foam body in which an elongated aperture is to be provided, pressing against the surface of the foam body at a desired location; an elongated heating configuration, the heating configuration adjacent the foam body having a narrow elongated tapered point and a body portion having a dimension generally commensurate with the dimension of the desired aperture; heating the body to a temperature sufficient to melt the synthetic resinous foam at a desired rate; maintaining the tapered point at a temperature below the temperature of the body portion; the tapering point being axially and symmetrically disposed relative to the body portion; applying pressure to the configuration and forcing the configuration through the foamed body and melting the foamed body as the configuration passes therethrough.

The method of the invention is particularly adapted to be practiced with the apparatus in accordance with the invention which comprises in cooperative combination a frame; a guide affixed to the frame, the guide defining a longitudinal passageway; a lance comprising a conduit slidably disposed within the guide, the conduit having a first or foam engaging end and a second end; a foam melting head affixed to the first end of the conduit, the foam melting head being generally in axial relationship with the axis of the conduit; the foam melting head having a body portion; beneficially the body portion having a cross-sectional configuration at least commensurate with that of the conduit; the foam melting head having a first end and a second end, the first end of the foam melting head affixed to the conduit, the second end of the foam melting head defining a thermally conductive elongated pointed configuration, the smallest portion of the pointed configuration being remotely disposed from the conduit and in a generally coaxial relationship to the conduit; a heating means disposed within the body portion; means to press the conduit and melting head into the body of the foam to be penetrated.

Further features and advantages of the present invention will become more apparent from the following specification taken in connection with the drawing wherein:

The figure schematically depicts an embodiment of the invention generally designated by the reference numeral 10. The apparatus 10 comprises a frame or support 11; the support 11 defines a base plate or work piece engaging means 12; a support or frame 13 is affixed to the base plate 12; the frame 13 comprises a first leg 14 and a second leg 15 rigidly affixed to the base plate 12; a pair of cross members 17 and 18 connect the members 15 and 14; the members 15 and 14 extend on each side of the plate 12 and define a space 19 therebetween; a conduit support 20 is rigidly affixed to the cross members 17 and 18 and remotely disposed from the base 12; the support means 20 comprises a first portion 20a and a second portion 20b which are hingeably affixed by means not shown; a latch mechanism 26 serves to releasably secure the portions 20a and 20b in facing relationship to each other; the body 20 defines a generally cylindrical passageway 28 which extends in a direction generally normal to the base 12; the passageway 28 is defined in part by the body portion 20a and the body portion 20b by a pair of generally semi-circular grooves formed therein; a lance generally designated by the reference numeral 30 is slidably supported within the passageway 28; the lance 30 comprises a conduit 31; the conduit 31 has a first end 32 and a second end 33; the conduit 31 passes through an aperture 34 in the base 12; a foam melting head 36 is rigidly affixed to the first end 32 of the conduit 31; the melting head 36 comprises a hollow body portion 37 and a solid foam engaging or terminal end 38; the terminal engaging end 38 has an elongated tapered configuration and is symmetrically disposed relative to the axis of the conduit 32; the foam engaging end 38 has a pointed terminal end 39 remotely disposed from the first end 32 of the conduit 31; the foam engaging end 38 is in thermal contact with the foam melting head 37; disposed within the hollow foam melting head 37 is a heating means 41 which beneficially is of the electrical resistance variety; a temperature control means 42 is in operative association with the heater 41; a pair of electrical leads 43 and 44 extend upwardly through the conduit 31 to the second end 33 into a junction box 46. Advantageously, for use in the vertical position, the junction box 46 may be weighted to provide additional means to force the conduit 31 downwardly when assisted by gravity. A power source 48 is in operative communication with the junction 46 by means of a cable 49. A large thermoplastic synthetic resinous slab 50 is shown in operative engagement with the apparatus 10 wherein the lance 30 has penetrated entirely therethrough.

In the operation of the apparatus of the present invention, the frame such as the frame 11 is positioned on an edge or desired location of a foam body to have a hole or opening formed therein; the guide means or support 20 is opened; the lance inserted, and the body portions 20a and 20b brought together and locked. Usually, such an arrangement is desirable as the diameter of the foam melting head 36 is greater than that of the conduit in order to provide free passage of the conduit through an opening formed by the melting head 36. The lance may be installed with or without power applied to the heating element 41. The point 39 is disposed on the foam; heat is transferred from the heating body 37 to the point 39 by means of conduction. The thermoplastic resinous foam is melted and under the force of gravity a straight desired opening having a cross-sectional configuration of the foam melting head or lance head 36 is obtained.

If operation is in a vertical position or by means of generated pressure applied either manually, hydraulically, pneumatically or by any other conventional means, the lance melts its way through the foam body.

It is found that relatively short holes may be prepared in foam bodies employing a blunt pointed lance. However, for deep or long holes, the elongated tapered tip such as the tip 38 which permits a significant temperature gradient to occur is essential when foam of nonuniform density is to be penetrated. As the temperature of the tip is below the temperature of the main body, the highest pressure appears at the tip and lateral deviation of the lance is avoided or substantially reduced.

Beneficially, the apparatus of the present invention may be constructed from a wide variety of materials, including metal, wood, plastics and the like. However, the lance point or heating head such as the head 36 is beneficially constructed of a metal having a relatively high thermal conductivity, such as aluminum; however, lance tips or heating heads of brass, magnesium, steel, stainless steel and the like are found to be suitable. Usually, for most application, a sharply tapering point of the lance should be avoided and a long gentle taper which decreases away from the heating element is usually most desirable for maintaining accurate holes.

Employing the method and apparatus of the invention, ¾ inch holes are accurately made through 10 feet of polystyrene foam with no difficulty or undesired deviation from a relatively straight line. Cylindrical walls 8 and 10 feet high prepared in the manner of U.S. Patent 3,206,899 as well as relatively homogenous foam bodies are equally successfully as well penetrated by the method and apparatus of the invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

I claim:
1. A method for the formation of long holes in synthetic resinous thermoplastic bodies, the steps of the method comprising providing a foam body in which an elongated aperture is to be provided;

pressing against the surface of the foam body at a desired location; an elongated heating configuration, the heating configuration adjacent the foam body having a narrow elongated tapered point, and a body portion having a dimension generally commensurate with the dimension of the desired aperture;

heating the body by means of the heating configuration to a temperature sufficient to melt the synthetic resinous foam at a desired rate;

maintaining the tapered point at a temperature below the temperature of the body portion, the tapered point being axially and symmetrically disposed relative to the body portion;

applying pressure to the configuration and forcing the configuration by means of gravity through the body and melting the foamed body as the configuration passes therethrough.

2. The method of claim 1 wherein the heating configuration is electrically heated.

3. The method of claim 1 wherein the foam body is polystyrene.

4. An apparatus for the formation of long holes in synthetic thermoplastic resinous foam bodies, the apparatus comprising in cooperative combination a frame;
a guide affixed to the frame, the guide defining
a longitudinal passageway;
a lance comprising
a conduit slidably disposed within the guide, the conduit having
a first or foam engaging end and a second end;
a foam melting head affixed to the first end of the conduit, the foam melting head being disposed in generally axial relationship with the axis of the conduit;
the foam melting head having
a body portion and
a first end and a second end;
the first end of the foam melting head affixed to the conduit;
the second end of the foam melting head defining a thermally conductive elongated pointed configuration, the smallest portion of the pointed configuration being remotely disposed from the conduit and in generally coaxial relationship to the conduit;
a heating means disposed within the body portion and means to force the conduit and foam melting head into the body of foam to be penetrated.

5. The apparatus of claim 4 wherein the body portion has a cross-sectional configuration at least commensurate with that of the conduit.

6. The apparatus of claim 4 wherein the heating means is an electrical resistance heater.

7. The apparatus of claim 4 wherein the guide defining the longitudinal passageway comprises first and second support means hingeably affixed and defining a passageway therebetween.

8. The apparatus of claim 4 wherein the frame comprises a base plate adapted to contact a foam body and maintain the guide in a fixed relationship to the foam body.

References Cited
UNITED STATES PATENTS 2,374,706   5/1945   Saslaw _____ 83—16 X WILLIAM S. LAWSON, *Primary Examiner.*